United States Patent [19]

Bell et al.

[11] 4,431,612

[45] Feb. 14, 1984

[54] APPARATUS FOR THE DECOMPOSITION OF HAZARDOUS MATERIALS AND THE LIKE

[75] Inventors: Christy W. Bell, Berwyn; Charles H. Titus, Newtown Square; John K. Wittle, Berwyn, all of Pa.

[73] Assignee: Electro-Petroleum, Inc., Wayne, Pa.

[21] Appl. No.: 384,613

[22] Filed: Jun. 3, 1982

[51] Int. Cl.[3] .............................................. C01B 13/11

[52] U.S. Cl. .......................... 422/186.21; 422/186.18; 422/186.08; 422/186.23

[58] Field of Search ............... 204/158 R, 158 P, 165, 204/157.1 P; 422/186.21, 186.22, 186.23, 186.26, 22, 24

[56] References Cited

U.S. PATENT DOCUMENTS

| | | | |
|---|---|---|---|
| 2,763,903 | 9/1956 | Herres | 22/57 |
| 3,332,870 | 7/1967 | Orbach et al. | 204/323 |
| 3,445,191 | 5/1969 | Bruning et al. | 23/277 |
| 3,446,902 | 5/1969 | Akers | 13/18 |
| 3,680,163 | 8/1972 | De Corso | 13/9 |
| 3,736,359 | 5/1973 | Bowman | 13/9 |
| 3,749,029 | 7/1973 | Bakker et al. | 110/7 R |
| 3,812,620 | 5/1974 | Titus et al. | 48/65 |
| 3,852,061 | 12/1974 | Wulff | 75/10 |
| 3,944,412 | 3/1976 | Liu | 75/10 |

*Primary Examiner*—R. L. Andrews
*Assistant Examiner*—Terryence Chapman
*Attorney, Agent, or Firm*—Dann, Dorfman, Herrell and Skillman

[57] ABSTRACT

A method and apparatus for the destruction of PCBs and other hazardous material utilizes a gas-tight chamber (18) which includes a high current DC arc (72). The chamber (18) is adapted to receive the PCBs or other hazardous material and includes a sump (20) which contains a molten bath (22). Inlet means (24, 26, 28) are provided for introducing the hazardous material into the chamber (18) and into contact with the molten bath (22) for initial decomposition into a molten product and a gaseous product. Electrode means (66, 68) are provided for maintaining the DC arc (72) at a current level sufficient to promote decomposition of the PCBs or other hazardous material. The gaseous product is passed in the proximity of the arc (72) for producing a decomposed gaseous product which is relatively harmless. The system is capable of decomposition of solid, liquid and gaseous PCBs, as well as other hazardous material.

20 Claims, 5 Drawing Figures

APPARATUS FOR THE DECOMPOSITION OF HAZARDOUS MATERIALS AND THE LIKE

BACKGROUND OF THE INVENTION

The present invention relates generally to a method and apparatus for the decomposition of hazardous materials, such as polychlorobiphenyls (PCBs) and the like, and, more particularly, to such a method and apparatus for the pyrolysis of PCBs and other such hazardous materials utilizing a D.C. arc in a sealed electric arc furnace.

DESCRIPTION OF THE PRIOR ART

Polychlorobiphenyl materials (PCBs) have been used extensively in the past in electrical equipment such as transformers and capacitors, due in a large part to their flame retardant characteristic, high temperature stability, inertness to biodegradation and excellent dielectric properties. Other uses in mining equipment, hydraulic systems and heat transfer systems were prompted by these same properties.

In the nineteen sixties it was discovered that PCBs were highly toxic and the environmental impact of PCB contamination received a great deal of coverage in the public press. The fact that PCBs were found to be carcinogenic in mice and are extremely stable has resulted in the enactment of legislation severely restricting the manufacturing, processing and sale of PCBs. The storage and disposal of existing PCBs and materials containing PCBs has also been the subject of legislation, as well as regulation by governmental agencies, such as the Environmental Protection Agency. The exceptional chemical stability which makes PCBs useful as a dielectric fluid and heat transfer agent also makes it extremely difficult to destroy.

Four basic techniques have been previously developed for PCB disposal: landfill; chemical destruction; biological destruction; and incineration/pyroylsis.

The simplest and lowest cost technique used for disposal of PCBs has been by landfill. However, at the present time there is only a relatively small number of landfill sites which have obtained the requisite permits from the Environmental Protection Agency and other government agencies for receiving and disposing of PCBs. In the present era of increasing public awareness and with the existing regulatory structure, it is unlikely that a significant number of new landfill sites will be approved for disposal of PCBs. In addition, the existing governmental regulations only permit the disposal of solid materials contaminated by PCBs at landfill sites (liquid PCBs must be incinerated), thereby necessitating the prior draining, flushing and storage of all liquid PCBs. Thus, it is clear that the disposal of PCBs utilizing landfill sites is not a viable final solution to the PCB disposal problem.

Various chemical treatment processes have reportedly been successfully used for the destruction of small quantities of PCBs in the laboratory. One such technique involves the treatment of PCBs with alkaline 2-propanol solution followed by exposing the resulting material to ultraviolet light for a predetermined period of time. Another such chemical treatment technique involves the stepwise removal of electrons from the aromatic ring system of the PCBs, followed by hydrolysis, solvolysis, oxidative coupling and dimerization utilizing high anodic potentials in acetonitrile.

While the above-described chemical treatment process, as well as other chemical treatment processes, have achieved some success in the decomposition of PCBs, the techniques have only been employed in connection with very small quantities of PCBs. These chemical treatment processes would be cumbersome and extremely expensive to employ in connection with the decomposition of large quantities of PCBs. In addition, some of the chemical treatment processes have resulted in the generation of hazardous by-products, which require additional special handling and destruction.

Although PCBs are generally thought to be extremely resistant to biological or enzyme attack, recent studies have shown that some PCBs are degradable by certain strains of bacteria and soil fungus. One such technique involves the use of acromasacter (two species) *pseudomonas* sp, *acinetrobacter* sp strain y42+33, and *acinetobacter* sp strain P6 to oxidatively degrade PCBs to chlorobenzoic acids. A second technique as described in U.S. Pat. No. 3,779,866 employs strains of *caldosporium cladosporicides, candidelipolytice, nocardia globerola, nocardia rubra* and/or *saccharomyces cerevisiae* to totally destroy PCBs.

Again, while the above-described and other biological techniques have achieved some success in the destruction of PCBs in limited quantities, none of these biological techniques have offered a solution to the disposal of large quantities of PCBs in an environmentally sound manner at a reasonable cost.

In regard to incineration of PCBs, it has been found that PCBs have high thermal stability and generally require combustion temperatures on the order of 1600° C. for total destruction. Although numerous prior art attempts have been made to develop a method or system for the incineration of PCBs utilizing different variations of conventional combustion techniques, the prior art methods and processes for the most part have been unsuccessul primarily due to the extreme difficulty involved in maintaining the required 1600° C. temperature. The failure to maintain the requisite temperature generally results in an incomplete destruction of the PCBs and may result in the generation of even more toxic by-product materials, such as hexachlorobenzene or polychlorinated dibenzofurans. In addition, the prior art incineration/pyroloysis methods were primarily used for the destruction of liquid PCBs due to difficulties in employing such methods in connection with solids. Furthermore, the prior art techniques resulted in the generation of large volumes of gas which had to be collected and scrubbed to remove various impurities therefrom.

The present invention was developed to overcome various problems associated with a number of prior art destruction processes. More specifically, the present invention comprises a method and apparatus for the destruction of PCBs and other hazardous materials utilizing a totally sealed system, which includes a high current DC arc for maintaining a temperature considerably in excess of 1600° C. and for providing bond-breaking ultraviolet and other radiation. The use of the DC arc assures that the original PCBs are decomposed into relatively harmless gaseous components and that no dangerous intermediate chemicals remain in the exhaust gas. The system of the present invention is capable of effective decomposition of both solid and liquid PCBs and, due to the lack of oxygen or other atmospheric gases present in the sealed system, the need for excessive containment and scrubbing equipment for the exhaust gases is effectively reduced.

SUMMARY OF THE INVENTION

Briefly stated, the present invention comprises a method and apparatus for the decomposition of hazardous material utilizing an electrical direct current (DC) arc. A gas-tight chamber is adapted to receive the hazardous material, the chamber including a sump which contains a molten bath. Inlet means are provided for introducing the hazardous material into the chamber and the molten bath for initial decomposition thereof into a product within the molten bath and a gaseous product which remains within the chamber. Electrode means are provided for maintaining a DC arc within the chamber, the arc having a current level sufficient to promote the decomposition of the hazardous material. An exhaust means is provided within the chamber proximate to the arc for the removal of gases from the chamber. Gases liberated into the chamber are passed in the proximity of the arc for undergoing decomposition prior to their removal through the exhaust means.

BRIEF DESCRIPTION OF THE DRAWINGS

The foregoing summary, as well as the following detailed description of a preferred embodiment and several alternate embodiments of the present invention, will be better understood when read in conjunction with the appended drawings, in which.

DESCRIPTION OF THE PREFERRED AND ALTERNATE EMBODIMENTS

Figure 1:
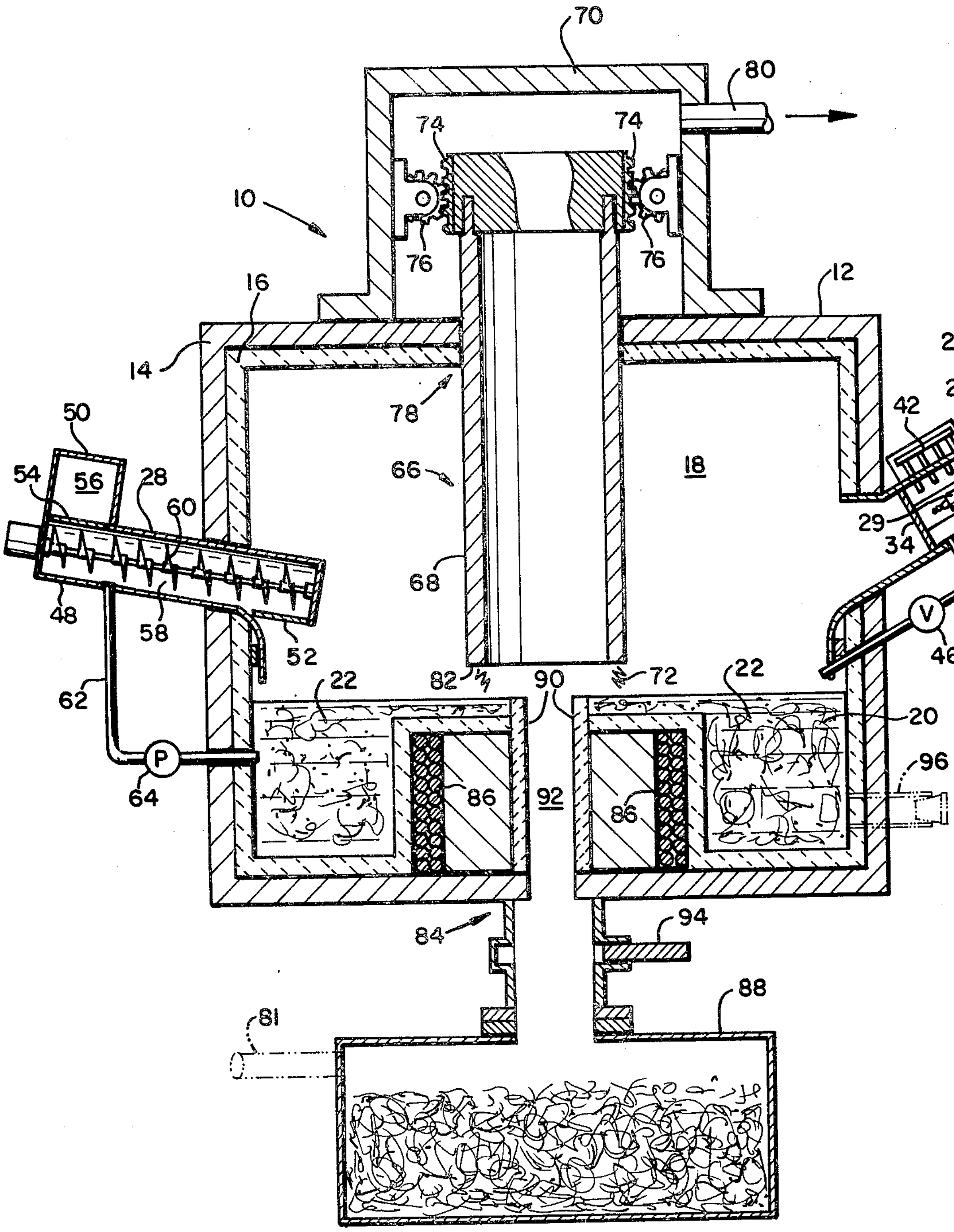
FIG. 1 is a schematic elevational view, partially in section, of a preferred embodiment of an apparatus for the decomposition of hazardous material in accordance with the present invention.

Referring to FIG. 1, there is shown a schematic view of an apparatus or pyrolytic furnace indicated generally as 10, for the decomposition of liquid, solid or gaseous hazardous materials or any combination thereof, such as polychlorobiphenyls (PCBs), PCB contaminated liquids and solids and the like, into innocuous gases by pyrolysis employing a D.C. arc. It has been found that by subjecting PCBs and PCB contaminated liquids and solids to a two-step process in which they are initially exposed to a high temperature (such as in a molten bath) to promote initial decomposition into a gaseous product and then exposing the gaseous product to a high current, high temperature D.C. arc, the resulting gaseous product produced comprises CO, $CO_2$, $H_2$, $CH_4$ and HCl.

The furnace 10 comprises, in this embodiment, a generally cylindrical housing 12 having an outer containment shell 14, which may be comprised of steel or any other similar electrically conductive structural material, and an inner refractory lining 16, which may be comprised of any suitable known electrically conductive furnace lining material, for example, graphite. Because of the high temperatures and pressures involved in the decomposition process conducted within the furnace 10, the outer shell 14 and/or the inner lining 16 must be capable of withstanding an interior pressure of five atmosphere and may be cooled in any conventional manner, for example, by circulating cooling fluid (such as water) through fluid passages (not shown) which may be embedded within or adjacent to the outer shell 14 and/or the inner lining 16.

Due to the hazardous nature of the PCBs and other materials which are to be decomposed within the furnace 10, it is important that the furnace 10 be carefully constructed to maintain a completely gas-tight chamber 18 within which the decomposition takes place. Suitable seals (not shown) are employed where required to maintain the chamber 18 in a gas-tight condition. In this manner, leakage of unreacted or partially decomposed toxic gases into the atmosphere can be avoided. In addition, in the gas-tight chamber, the presence of oxygen in the furnace 10 can be avoided to thereby provide a reducing environment which permits the use of unconventional lining material (such as graphite which would quickly deteriorate from burning in the presence of oxygen) for the furnace 10.

The lower portion of the furnace 10 forms an annular sump 20 within the chamber 18. The sump 20 has maintained therein a molten bath 22 comprised of metals, salts or any other suitable material which, in its molten state, is a good electrical conductor. The molten bath 22 serves to promote the initial decomposition or volitization of the PCBs and other hazardous materials, which may be introduced into the furnace 10, into a gaseous product which is liberated into the chamber 18 above the molten bath 22. In addition, the molten bath 22 serves to melt or decompose any other organic or inorganic materials which may be introduced into the furnace and remain in the molten bath. Such organic or inorganic materials may include, for example, the metal, plastic or cellulose packaging materials which were employed to contain the PCBs. It is considered necessary to destroy such container materials since, due to their prior contact with the PCBs, they are also considered to be hazardous.

As will hereinafter be described in more detail, the temperature of the molten bath 22 is maintained at a level commensurate with the volitization temperature of the particular hazardous material being decomposed. For example, when PCBs are being decomposed, the temperature level of the molten bath may be on the order of 1500° C., which is lower than the temperature for complete destruction of PCBs in the prior art, but lower temperatures are possible in the present system due to the use of the arc which significantly aids the destruction process.

The furnace 10 includes inlet means, shown generally as 24, for charging or introducing the hazardous material from the outside of the housing 12 into the chamber 18. The inlet means 24 comprises a plurality of individual charging ports positioned at various locations around the circumference of the housing 12. By positioning the charging ports around the circumference of the housing 12, the PCBs or other hazardous material may be immersed into different areas of the molten bath 22 (perhaps sequentially) to thereby prevent excessive localized cooling of the molten bath 22 which may occur if only a single charging port is employed. The charging ports must be capable of introducing PCBs or other hazardous material into the chamber 18 while maintaining a generally gas-tight system. In this manner, the furnace 10 has the capability of operating batch (one charge of hazardous material at a time) or operating continuously (continuous addition of hazardous material).

In the present embodiment, two different types of charging ports 26 and 28 are shown and will hereinafter be described in some detail. Furnace 10 may include one or more of each type of the charging ports 26 and 28 or may include one type of charging port or ports. Charging ports 26 and 28, which each comprise a two stage air-lock arrangement, are but two examples of the types of charging ports which may be employed for introducing hazardous material into the chamber 18. Therefoe, it should be appreciated that the present invention is not limited to the specific type or combination of charging ports disclosed but could employ any other suitable type or combination of inlet means which allows for introduction of hazardous material into the furnace 10 while effectively maintaining the chamber 18 in a gas-tight condition to prevent the escape of any toxic or otherwise hazardous gas.

Charging port 26 is particularly suited for introducing, for example, capacitors designated 29 into the furnace 10. Capacitors 29 of the type shown may comprise ceramic, cellulose plastic metal and some form of generally sealed metalic outer container which enclose (sometimes under pressure) liquid PCBs as a dielectric element. Both the PCBs within the container and the container itself must be disposed of as hazardous materials. The charging port 26 comprises a sealed (gas-tight) generally tubular passage 30 having an entry port 32 on a first or outer end and an exit port 34 on the second or inner end. The sealed passage 30 further includes a closable partition means 36 positioned approximately halfway between the entry port 32 and the exit port 34 to divide the sealed passage into a first outer compartment 38 adjacent to the entry port 32 and a second inner compartment 40 adjacent to the exit port 34. Each of the ports 32 and 34 and partition 36 are adapted to open and close independently of each other and to provide tight seals when closed, so that the charging port 26 has the capability of continuously charging or introducing material into the furnace 10 while continuing to maintain the gas-tight condition of the chamber 18.

In the operation of the inlet device 26, the ports 32 and 34 and partition 36 are initially closed as shown. The entry port 32 is then opened and capacitor 29, or other solid or liquid hazardous material to be decomposed or destroyed, is admitted or inserted into the first compartment 38 as shown. The entry port 32 is then closed and the first compartment 38 is evacuated (employing any known suitable means) to prevent the introduction of oxygen into the chamber 18. Thereafter, the partition 36 is opened and the capacitor 29 is passed from the first compartment 38 into the second compartment 40. In the embodiment shown on FIG. 1, the tubular passage 30 slopes slightly downwardly so that the capacitor 29 may simply slide or roll downwardly from the first compartment 38 through the partition 36 to the second compartment 40. Alternatively, any other suitable means could be employed for moving the capacitor 29 from the first compartment 38 to the second compartment 40, such as a push rod (not shown) or a conveyor belt (not shown).

Once the capacitor 29 is positioned within the second compartment 40, the partition 36 is again closed and the first compartment 38 is evacuated to prevent the escape (to the atmosphere) of any toxic gas when the entry port 32 is opened again. The exit port 34 is then opened and the capacitor 29 passes from the second compartment 40 along the downwardly sloping passage 30 and into the molten bath 22. As previously mentioned, any other suitable means may be employed for moving the capacitor 29 from the second compartment 40 into the molten bath 22.

While in some cases it is desirable to have entire capacitors inserted directly into the molten bath 22 as described above, in other cases this is not an acceptable procedure. Because of the size and construction of some capacitors, and particularly large pressure sealed capacitors, the immersion of the entire capacitor directly into the molten bath 22 would result in a build-up in pressure within the capacitor and eventually a violent or uncontrolled explosion which may result in potential damage to the furnace. In order to alleviate the potential explosion hazard, the second compartment 40 may include suitable means 42, for example the multi-pronged "iron maiden" shown in FIG. 1, for puncturing and/or crushing the capacitor 29 in order to prevent the formation of excessive pressure. In addition, by puncturing or crushing the capacitor 29 in this manner, the liquid PCBs within the capacitor 29 are permitted to drain from the capacitor container.

The lower end of the second compartment 40 includes an opening into a conduit means or drain pipe 44 which communicates with the interior of the chamber 18 as shown. The drain pipe 44 receives liquid PCBs from the punctured or crushed capacitor 29 and allows liquid PCBs to flow into the molten bath 22. The liquid PCBs may be preheated utilizing waste heat from the furnace 10 (not shown) prior to their entering the molten bath 22. A suitable valve means 46, which may be provided by any suitable known control valve, may be installed within the drain pipe 44 in order to restrict and control the flow of liquid PCBs into the molten bath 22. In addition, the liquid PCBs may be pressurized, atomized and sprayed (not shown) against the surface of the molten bath 22 to provide more intimate contact between the PCBs and the molten bath and to avoid localized cooling of the bath.

As discussed briefly above, each of the compartments 38 and 40 of the charging port 26 also includes a suitable evacuation system (not shown) for removing any gases which may enter either compartment from the chamber 18 or from the atmosphere. The evacuated gas from the compartments 38 and 40 is preferably recycled back into the chamber 18 by any suitable means (not shown) to provide for the processing of any hazardous gas which may be present. Such an evacuation system may be of any suitable known type and need not be described in detail for a complete understanding of the present invention.

Charging port 28 is similar to charging port 26, in that, it comprises a generally tubular sealed (gas-tight) passage 48 having an entry port 50, an exit port 52 and a partition means 54 to divide the passage 48 into a first outer compartment 56 and a second inner compartment 58. Both of the compartments 56 and 58 include an evacuation system (not shown) for the purposes described in connection with charging port 26. However, unlike charging port 26, the second compartment 58 of charging port 28 includes a conventional motor driven screw conveyor or auger 60. The screw conveyor 60 transports the PCBs and the PCB containers received within compartment 58 to the exit port 52 and for the reasons as stated above, punctures or crushes the capacitors or containers.

The second compartment 58 of the inlet device 28 also includes a conduit means or drain pipe 62 for conveying the liquid PCBs from punctured capacitors (not shown) within the second compartment 58 to the molten bath 22. However, unlike the previously discussed arrangement of drain pipe 44, drain pipe 62 empties directly into the molten bath 22 below the surface thereof. A suitable pump 64 is employed to provide enough pressure to "bubble" the liquid PCBs directly into the molten bath 22 as well as to control the flow rate of liquid PCBs into the bath.

As discussed above, the immersion of the PCBs into the high temperature molten bath 22 results in the decomposition of the PCBs into gases which remain within the chamber 18 above the molten bath 22. As the gases come into contact with the high temperature upper surface of the molten bath 22, the chemical bonds are further broken. By controlling the quantity of PCBs which are immersed into the molten bath 22 (i.e., through the use of valve 46 and pump 64), the quantity of the gases subsequently released into the chamber 18 and thus, the gas pressure within the chamber 18, may be controlled. The housing 12 should be strong enough to withstand a gas pressure of five atmospheres within the chamber 18 with no uncontrolled leakage of gas to the atmosphere.

The furnace 10 also includes electrode means, generally designated 66, for maintaining a direct current (DC) electric arc within the chamber 18. The electrode means 66 comprises in part an elongated tubular electrode 68 movably mounted to the furnace cover 70. The electrode 68 is moved vertically with respect to the molten bath 22 for the purpose of establishing and maintaining the desired electrical arc (shown generally as 72) extending from the arcing tip 82 to the molten bath 22. Any suitable means may be employed for the vertical movement of the electrode 68. For example, a rack 74 may be fixed to the electrode and a suitable pair of motor-driven pinions 76 may be employed to engage the electrode rack 74 for movement thereof in either vertical direction.

The furnace 10 also includes exhaust means, generally designated 78, for the removal of gases from the gas-tight chamber 18. In the present embodiment, the exhaust means 78 comprises the hollow interior of the tubular electrode 68 which communicates with a suitable exhaust conduit 80 extending through the furnace cover 70 to atmosphere. However, it should be appreciated that any other suitable exhaust means (other than the hollow interior of the tubular electrode 68) could be employed for the removal of gases from the chamber 18. The only requirement for the exhaust means 78 is that its entrance be located proximate to the arcing tip 82 of the electrode 68, so that all of the gases within the chamber 18 must pass near or through the arc 72 before being exhausted from the furnace 10.

The exhaust gas removed from the furnace 10 may be received and stored in suitable containers (not shown) for testing and analysis. If the analyzed gas is found to be clean enough to comply with existing regulations or standards, it may be exhausted directly to the atmosphere. If the analyzed gas is found to be of unacceptable quality, it may be further processed by a suitable device such as a bubble tank (not shown) or a scrubber (not shown). An exit gas afterburner (not shown) may also be employed. In the event that the exhaust gas from the furnace still contains toxic or other hazardous material, the gas may be recycled by any suitable means (not shown) back into the chamber 18 for further processing relative to the electric arc. Suitable heat exchange means (not shown) may be provided to lower the temperature of the exhaust gases from the furnace and to reclaim or recycle the recovered thermal energy.

In order to provide a substantially continuous DC arc within the chamber 18 between the arcing tip 82 of the electrode 68 and the molten bath 22, the outer shell 14 of the furnace is connected to ground (not shown) and the electrode is connected to a suitable low voltage, solid state DC current supply (not shown). Preferably, the DC current supply is so poled that the electrode 68 is negative with respect to the outer shell 14. The conductive inner lining 16 and the conductive molten bath 22 are also maintained at ground potential. Thus, the electrode 68 constitutes the negative terminal and the molten bath 22 constitutes the positive terminal of a DC load circuit. As shown, the two terminals (the electrode 68 and the molten bath 22) are spaced apart in operation to provide between them an arc gap of a predetermined distance in which the arc 72 exists when the circuit is energized. A current regulator (not shown) may be provided to maintain a substantially constant predetermined arc level as required for the desired decomposition of the hazardous material being processed. Arc voltage sensing equipment (not shown) may also be employed to compare the arc voltage with a preset reference for comparison and arc length control. A DC choke coil (not shown) may also be connected in series with the DC arc current path in order to prevent arc extinction due to any sudden rise in arc voltage, any sudden cooling of the arc due to endothermic chemical reactions, or to transient gas pressures which occur during PCB decomposition.

The arc 72 provides the primary heat to initially melt and thereafter maintain the material within the sump in the molten state. The arc 72 also serves as a source of radiation, for example, ultraviolet radiation, which assists in breaking the bonds of the PCBs. In addition, the extreme high temperature of the arc (10,000° C. or higher) assures that the gases and any previously non-decomposed material passing through or near the arc toward the exhaust means 78 and completely decomposed into the above-described generally innocuous gaseous elements.

In order to further insure that the gases from the chamber 18 obtain maximum exposure to the arc for complete decomposition, the furnace 10 also includes means, generally designated 84, for rapidly and uniformly moving the arc 72 in a predetermined path around the surface of the arcing tip 82 of the electrode 68. The rapid rotation of the arc 72 around the arcing tip 82 also provides a more uniform distribution of heat to the molten bath 22 and processing in the chamber 18 which tends to preserve the inner lining 16. The rotating arc also puts pressure on the molten bath material where the arc hits the molten bath 22, this together with the high temperature of the arc causes the material to boil and form an indentation in molten bath material. The rotation of the arc around the arcing tip 82 may be so fast that the indentation may not be refilled, and high temperature boiling material is spewed out in the vicinity of the indentation. The gases passing proximate the arc are contaced by the heat and the super heated bath material to aid in decomposition.

In the present embodiment, the means for moving the arc around the surface of the arcing tip 82 of the tubular electrode 68 comprises magnetic means in the form of an annular electromagnetic coil 86 positioned within the housing 12 beneath the arcing tip 82. The electromagnetic coil 86 is connected to a suitable DC voltage source (not shown) to generate a magnetic field having flux lines (not shown) extending generally perpendicular to the arc 72. In this manner, well-known magnetohydrodynamics principles are employed to move the arc 72 around the surface of the arcing tip 82. The rate of movement of the arc around the arcing tip 82 is controlled by controlling the location of the electromagnetic coil 86 and the intensity and orientation of the magnetic field generated by the coil 86. The magnetic field also serves to stir the molten bath 22 to provide more complete mixing of the molten bath material and the hazardous materials which are being decomposed. In this manner, the upper surface of the molten bath 22 is kept in condition to receive and react with newly introduced hazardous material.

As hazardous material and the various inorganic (metallic) containers associated therewith are added to the furnace 10, the level of the molten bath 22 tends to rise. In order to maintain the molten bath 22 at a predetermined depth commensurate with the size of the chamber, the length of the arc and other such factors, it is necessary to provide a means for removing some of the material from the molten bath 22 while still continuing the decomposition of the hazardous material. In the present embodiment, the means for maintaining the molten bath at the desired predetermined depth comprises a generally cylindrical container 88 positioned beneath the center of the furnace housing 12. An annular weir 90 is provided to establish the predetermined depth of the molten bath. Whenever the depth of the molten bath exceeds the height of the weir 90, molten material flows over the weir 90, through a conduit means or drain pipe 92 and into the cylindrical container 88. The conduit means 92 and the cylindrical container 88 are provided with suitable sealing means (not shown) in order to maintain the chamber 18 in the gas-tight condition.

The cylindrical container 88 is removably attached to the furnace housing 12. In this manner, material flowing from the molten bath 22 over the weir 90 may be collected in the cylindrical container 88 until the cylindrical container is filled. The cylindrical container may then be removed from the furnace housing 12 and the material collected therein may be suitably emptied and/or disposed of in a covnentional manner. In order to ensure that the chamber 18 remains gas-tight during the period of time when the cylindrical container 88 is removed for emptying, a suitable sealing apparatus 94 is provided to close off the conduit means 92. A suitable evacuation system (not shown) may also be provided to remove any gases which may have accumulated within the cylindrical container 88. The gases removed from the cylindrical container 88 are recycled back into the chamber 18. By first sealing off the conduit means 92 with the sealing apparatus 94 and then employing the evacuation system to remove gases accumulated in the cylindrical container 88, the container 88 may be removed for emptying without affecting the continued operation of the furnace 10. Once the empty container is replaced, the sealing apparatus 94 is again opened and molten material may again flow through the conduit means 92 for collection in the container 88.

Alternatively, excess material may be removed from the molten bath 22 by means of a standard tap or drain (shown in phantom as 96). However, in order to utilize such a tap or drain 96, it is first preferable to halt the normal operation of the furnace 10. Material removed through the tap 96 may be suitably disposed of in any conventional manner.

As a variation of the above-described embodiment, the gases from the chamber 18 may be exhausted through the conduit means 92, into the cylindrical container 88 and out of an alternate exhaust conduit (shown in phantom as 81). In this manner, the gases may react with the material within the container 88 for further processing.

Figure 2:
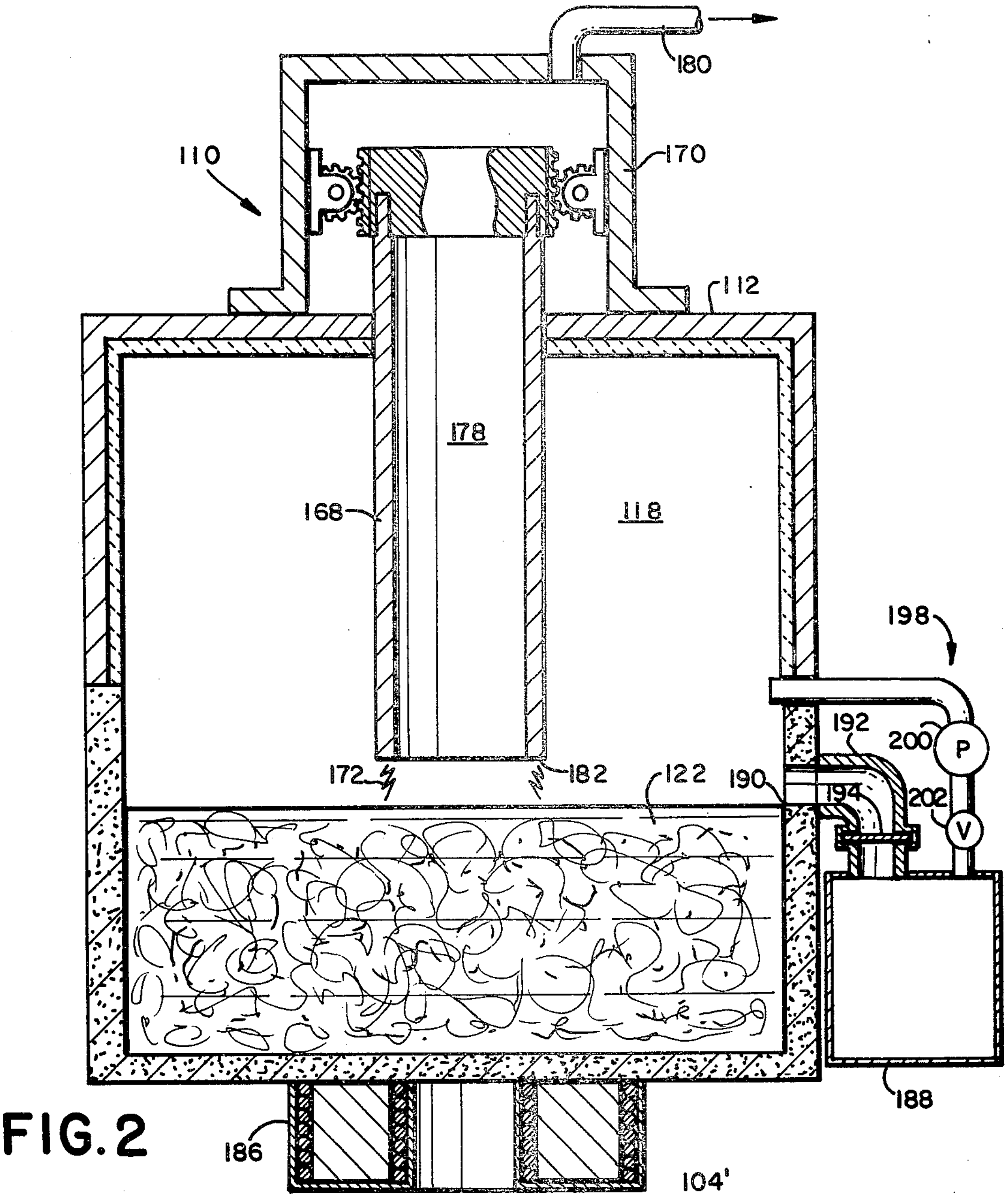
FIG. 2 is a schematic elevational view, partially in section, of an alternate embodiment of the apparatus of FIG. 1.

Referring now to FIG. 2, there is shown an apparatus or furnace 110 for the decomposition of hazardous material which is substantially the same as the furnace 10 of FIG. 1. In connection with the description of FIG. 2, the same numbers will be used for the same components but with the addition of 100 there to. Viewing FIG. 2, it can be seen that the furnace 110 comprises a generally cylindrical housing 112 which defines a gas-tight, generally cylindrical chamber 118. Within the chamber 118 is a molten bath 122 of metal, salt or any other suitable conductive material. A generally tubular electrode 168 is similarly movably attached to the furnace cover 170. As in the furnace shown in FIG. 1, the center of the tubular electrode 168 comprises an exhaust means 178 which further includes an exhaust conduit 180 to permit the removal of gases from the chamber 118 to the outside of the furnace 110. The furnace 110 further includes suitable inlet means (not shown in FIG. 2) for introducing hazardous material into the chamber 118 in the same manner as was shown and described in connection with FIG. 1.

The primary difference between the furnace 10 of FIG. 1 and the furnace 110 of FIG. 2 is in the manner in which the excess material is removed from the molten bath. As shown on FIG. 2, a generally cylindrical container 188 is provided adjacent to one side of the furnace housing 112. The adjacent side wall of the furnace housing 112 includes an opening which forms a weir 190 to establish the depth level of the material within the molten bath 122. Any material rising above the level of the weir 190 flows through a conduit means 192 and into the container 188. The container 188 is removable from the conduit means 192 and both the container 188 and the conduit means 192 are provided with suitable sealing means (not shown) to preserve the gas-tight integrity of the chamber 118. A suitable sealing apparatus 194 is provided to close off and seal the conduit means 192 when the container 188 has been removed for emptying. A suitable evacuation system 198 comprising a suitable pump 200 and a corresponding check valve 202 is provided to evacuate any gases which may accumulate in the container 188 prior to emptying the container. As shown, the gases removed from the container 188 are recycled back into the chamber 118 for further processing.

A further difference between the furnace 10 of FIG. 1 and the furnace 110 of FIG. 2 is in the location of the annular electromagnetic coil 186 which is employed to cause the rotation of the arc 172 around the arcing tip 182 of the tubular electrode 168. As shown, the electromagnetic coil 186 is located on the outside of the housing 112 beneath the electrode 168. In order to insure that the housing 112 does not interfere with the magnetic field generated by the external electromagnetic coil 186, the lower portion of the housing is comprised of non-magnetic material as shown. As in the embodiment of FIG. 1, the flux lines from the magnetic field are perpendicular to the arc 172, thereby causing the arc to rotate around the surface of the arcing tip 182.

Figure 3:
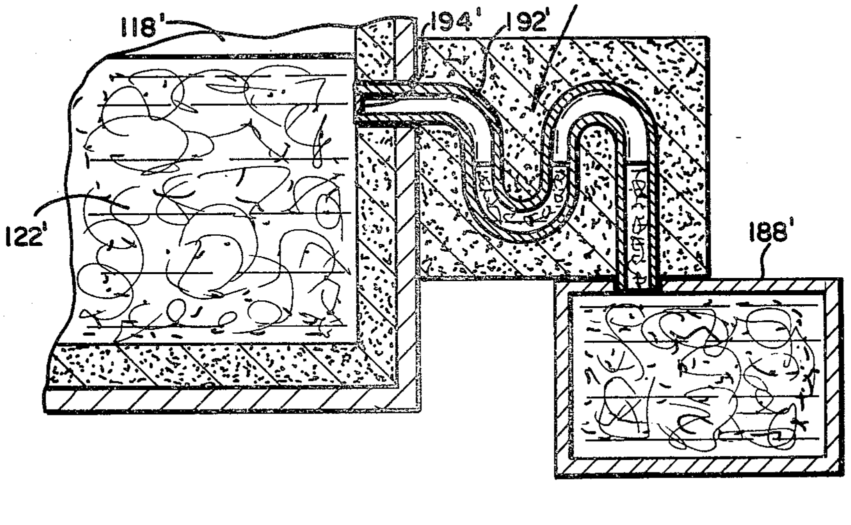
FIG. 3 is a fragmentary schematic sectional view showing a variation of a portion of the apparatus of FIG. 2.

FIG. 3 shows a slight variation of the furnace of FIG. 2, wherein the same numbers are used as appear in FIG. 2 but with the addition of primes thereto. In FIG. 3, the conduit means 192' for removing material from the molten bath 122' is positioned beneath the surface of the molten bath. The conduit 192' further includes a standard plumber's P-trap arrangement 104' to effectively prevent gases contained within the chamber 118' from entering the container 188'. A sealing apparatus 194' is also provided to facilitate the emptying of the container 188' without any interruption of furnace operation.

Figure 4:
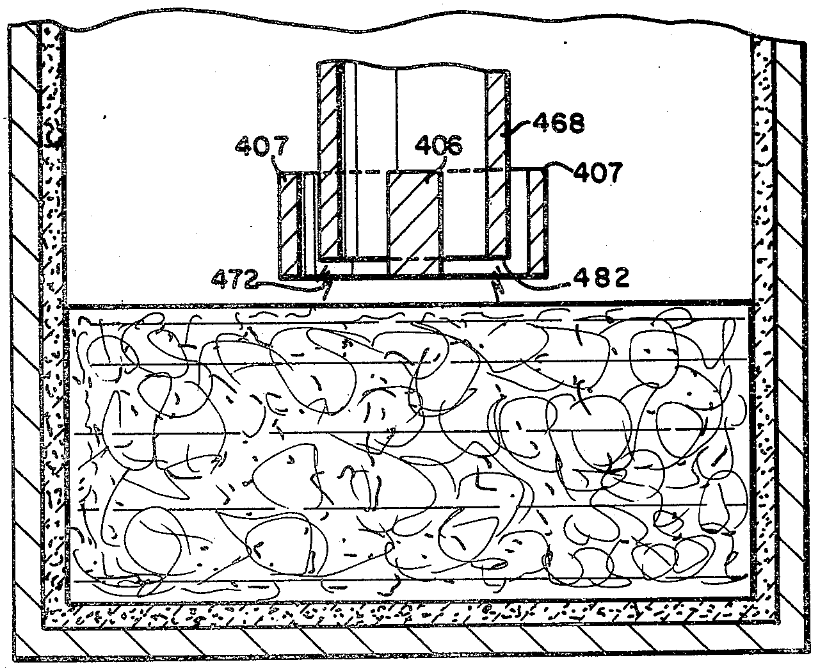
FIG. 4 is a fragmentary schematic sectional view showing a different variation of the apparatus of FIG. 2.

FIG. 4 shows a different variation of the furnace of FIG. 2 in which a different means is provided for moving the arc 472 around the arcing electrode tip 482. Referring to FIG. 4, the same numbers are used as in FIG. 1 but with the addition of 400 thereto. In FIG. 4, instead of employing an electromagnetic coil, as was done in connection with the embodiment of FIG. 2, a first generally cylindrical ferrous member 406 is positioned within the hollow interior of the tubular electrode 468 adjacent to the arcing tip 482. Similarly, a tubular ferrous member 407 surrounds the tubular electrode 468 adjacent to the arcing tip 482. Both of the ferrous members 406 and 407 may be cooled employing a suitable known cooling system (not shown) which uses a heat transfer fluid such as water (not shown). The ferrous members 406 and 407 interact with the arc current to generate a magnetic field having flux lines (not shown) which extend generally perpendicular to the arc 472. In this manner, the arc is made to rotate around the surface of the arcing tip 482 in the same manner as was discussed in detail in relation to the apparatus of FIG. 1.

Figure 5:
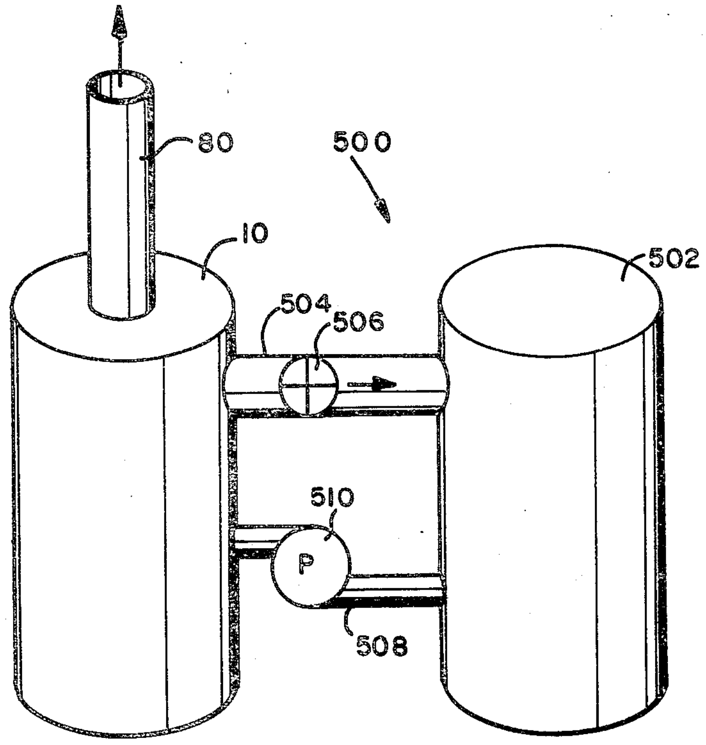
FIG. 5 is a schematic view of a pressure relief system employed in connection with the apparatus of FIGS. 1 or 2.

Referring now to FIG. 5, there is shown a schematic representation of a pressure relief system generally designated 500 which may be employed in connection with furnace 10 of the type described in FIG. 1 or any of the above-described alternative furnace embodiments. The pressure relief system comprises a sealed (gas-tight) container or surge tank 502 located proximate to the furnace 10. A suitable first conduit means 504 extends between the furnace 10 and the sealed container 502 and provides communication between the interiors thereof. A pressure relief valve 506 is positioned within the first conduit means 504 to control and effectuate relief of the pressure within the furnace 10, if necessary. As described above, the furnace 10 should be constructed to withstand an internal gas pressure of five atmosphere without leaking any gas therefrom. The pressure relief valve 506 should be designated to relieve the furnace pressure at a preset pressure point slightly less than the five atmosphere level.

Once the preset pressure point of the pressure relief valve 506 has been exceeded the excess gas from the furnace 10 flows into the container 502 thereby lowering the pressure within the furnace. A second conduit means 508 and a suitable pump 510 are provided to return gas from the sealed container 502 to the furnace 10 for further processing when the pressure within the furnace has decreased to an acceptable level.

From the foregoing description and the accompanying figures, it can be seen that the present invention provides a method and apparatus for the decomposition of PCBs and other hazardous material which is efficient, relatively easy to control and is very effective in operation. It will be recognized by those skilled in the art that changes or modifications may be made to the above-described embodiments without departing from the broad inventive concepts of the invention. It is understood, therefore, that this invention is not limited to the particular embodiments described, but it is intended to cover all changes and modifications which are within the scope and spirit of the invention as set forth in the appended claims.

We claim:

1. An apparatus for the decomposition of hazardous material utilizing a DC arc, comprising:
  - a gas-tight chamber including a sump which contains a molten bath;
  - inlet means for introducing the hazardous material into the chamber and the molten bath for initial decomposition of the hazardous material into a product within the molten bath and a gaseous product within the chamber;
  - electrode means for maintaining a DC arc within the chamber, the arc having a current level sufficient to promote the decomposition of the hazardous material, wherein the electrode means includes an elongated tubular electrode having a hollow interior and a first end maintained at a predetermined distance above the surface of the molten bath, the arc from the electrode being maintained to extend from the first end of the electrode across the predetermined distance to the molten bath;
  - means for moving the arc around the surface of the first end of the electrode at a predetermined rate including a first ferrous member within the hollow interior of the electrode adjacent the first end thereof; and a second tubular ferrous member surrounding the electrode adjacent the first end thereof, whereby the arc current interacts with the first and second ferrous members to generate a magnetic field having flux lines extending generally perpendicular to the arc, and
  - exhaust means within the chamber proximate to the DC arc for the removal of gases from the chamber, whereby the gaseous product passes in the proximity of the arc for undergoing decomposition prior to removal thereof through the exhaust means.

2. The apparatus as recited in claim 1 wherein the rate of movement of the arc around the surface of the first end of the electrode is controlled by the intensity and orientation of the magnetic field.

3. An apparatus for the decomposition of hazardous material utilizing a DC arc, comprising:
  - a gas-tight chamber including a sump which contains a molten bath;
  - inlet means for introducing the hazardous material into the chamber and the molten bath for initial decomposition of the hazardous material into a product within the molten bath and a gaseous product within the chamber;
  - electrode means for maintaining a DC arc within the chamber, the arc having a current level sufficient to promote the decomposition of the hazardous material;
  - exhaust means within the chamber proximate to the DC arc for the removal of gases from the chamber, whereby the gaseous product passes in the proximity of the arc for undergoing decomposition prior to removal thereof through the exhaust means; and means for maintaining a molten bath at a predetermined depth including a container for receiving material from the molten bath; conduit means communicating between the molten bath and the container for the passage of molten material from the molten bath to the container; and means for sealing the conduit means to block the flow of molten material from the molten bath to the container and to maintain the chamber in its gas-tight condition, wherein the container is positioned beside the chamber and the conduit means extends through a side wall of the chamber.

4. The apparatus as recited in claim 3 wherein the conduit means includes trap means to prevent gas from the chamber from entering the container.

5. An apparatus for the decomposition of hazardous material utilizing a DC arc, comprising:

a gas-tight chamber including a sump which contains a molten bath;

inlet means for introducing the hazardous material into the chamber and the molten bath for initial decomposition of the hazardous material into a product within the molten bath and a gaseous product within the chamber, wherein the inlet means comprises a multi-sealed passage having a closable entry port for access outside the chamber and a closable exit port providing communication inside the chamber, the passage further including closable partition means between the entry port and the exit port for dividing the passage into a first compartment adjacent the entry port and a second compartment adjacent the exit port, the sealed passage operating such that hazardous material is introduced into the first compartment with the partition means closed, the hazardous material passing from the first compartment into the second compartment through the partition means with the entry port and the exit port closed, and the hazardous material passing from the second compartment into the chamber through the exit port with the partition means closed;

electrode means for maintaining a DC arc within the chamber, the arc having a current level sufficient to promote the decomposition of the hazardous material; and exhaust means within the chamber proximate to the DC arc for the removal of gases from the chamber, whereby the gaseous product passes in the proximity of the arc for undergoing decomposition prior to removal thereof through the exhaust means.

6. The apparatus as recited in claim 5 including screw conveyor means for moving hazardous material from the second compartment into the chamber.

7. The apparatus as recited in claim 5 including means within the second compartment for puncturing containers with hazardous material therein to release hazardous material therefrom.

8. The apparatus as recited in claim 7 including conduit means communicating between the second compartment and the chamber for removing liquid hazardous material from the second compartment and introducing the liquid hazardous material into the chamber at a controlled rate.

9. The apparatus of claim 8 wherein the conduit means includes valve means for controlling the flow of liquid hazardous material from the second compartment to the chamber.

10. An apparatus for the decomposition of hazardous material utilizing a DC arc, comprising:

a gas-tight chamber including a sump which contains a molten bath;

inlet means for introducing the hazardous material into the chamber and the molten bath for initial decomposition of the hazardous material into a product within the molten bath and a gaseous product within the chamber;

electrode means for maintaining a DC arc within the chamber, the arc having a current level sufficient to promote the decomposition of the hazardous material, wherein the electrode means includes an elongated electrode having a first end maintained at a predetermined distance above the surface of the molten bath, the arc from the electrode being maintained to extend from the first end of the electrode across the predetermined distance to the molten bath;

means for moving the arc around the surface of the first end of the electrode at a predetermined rate including magnetic means operable to generate a magnetic field having flux lines extending generally perpendicular to the arc and operatively positioned underneath the gas-tight chamber and generally under the first end of the electrode; and exhaust means within the chamber proximate to the DC arc for the removal of gases from the chamber, whereby the gaseous product passes in the proximity of the arc for undergoing decomposition prior to removal thereof through the exhaust means.

11. The apparatus as recited in claim 10 wherein the rate of movement of the arc around the surface of the first end of the electrode is controlled by the intensity and orientation of the magnetic field.

12. An apparatus for the decomposition of hazardous material utilizing a DC arc, comprising:

a gas-tight chamber including a sump which contains a molten bath;

inlet means for introducing the hazardous material into the chamber and the molten bath for initial decomposition of the hazardous material into a product within the molten bath and a gaseous product within the chamber;

electrode means for maintaining a DC are within the chamber, the arc having a current level sufficient to promote the decomposition of the hazardous material, wherein the electrode means includes an elongated electrode having a first end maintained at a predetermined distance above the surface of the molten bath, the arc from the electrode being maintained to extend from the first end of the electrode across the predetermined distance to the molten bath;

means for moving the arc around the surface of the first end of the electrode at a predetermined rate including magnetic means operable to generate a magnetic field having flux lines extending generally perpendicular to the arc and operatively positioned within the gas-tight chamber under at least a portion of the sump and generally underneath the first end of the electrode; and exhaust means within the chamber proximate to the DC arc for the removal of gases from the chamber, whereby the gaseous product passes in the proximity of the arc for undergoing decomposition prior to removal thereof through the exhaust means.

13. The apparatus as recited in claim 12 wherein the rate of movement of the arc around the surface of the first end of the electrode is controlled by the intensity and orientation of the magnetic field.

14. An apparatus for the decomposition of hazardous material utilizing a DC arc, comprising:

a gas-tight chamber including a sump which contains a molten bath;

inlet means for introducing the hazardous material into the chamber and the molten bath for initial decomposition of the hazardous material into a product within the molten bath and a gaseous product within the chamber;

electrode means for maintaining a DC arc within the chamber, the arc having a current level sufficient to promote the decomposition of the hazardous material;

exhaust means within the chamber proximate to the DC arc for the removal of gases from the chamber, whereby the gaseous product passes in the proximity of the arc for undergoing decomposition prior to removal thereof through the exhaust means; and means for maintaining the molten bath at a predetermined depth including a container for receiving material from the molten bath; conduit means communicating between the molten bath and the container for the passage of molten material from the molten bath to the container; and means for sealing the conduit means to block the flow of molten material from the molten bath to the container and to maintain the chamber in its gas-tight condition, wherein the container is located beneath the chamber and wherein the conduit means extends upwardly a predetermined distance from the bottom of the chamber into the molten bath.

15. The apparatus as recited in claim 14 wherein said conduit means forms a weir in the molten bath and comprises said exhaust means comprises said conduit means.

16. An apparatus for the decomposition of hazardous material utilizing a DC arc, comprising:

a gas-tight chamber including a sump which contains a molten bath;

inlet means for introducing the hazardous material into the chamber and the molten bath for initial decomposition of the hazardous material into a product within the molten bath and a gaseous product within the chamber;

electrode means for maintaining a DC arc within the chamber, the arc having a current level sufficient to promote the decomposition of the hazardous material;

exhaust means within the chamber proximate to the DC arc for the removal of gases from the chamber, whereby the gaseous product passes in the proximity of the arc for undergoing decomposition prior to removal thereof through the exhaust means; and means for maintaining the molten bath at a predetermined depth including a container for receiving material from the molten bath; conduit means communicating between the molten bath and the container for the passage of molten material from the molten bath to the container; and means for sealing the conduit means to block the flow of molten material from the molten bath to the container and to maintain the chamber in its gas-tight condition, wherein the container is located beneath the chamber and wherein the conduit means extends upwardly a predetermined distance from the bottom of the chamber into the molten bath generally beneath the electrode means.

17. The apparatus as recited in claim 16 wherein said conduit means forms a weir in the molten bath and said exhaust means comprises said conduit means.

18. An apparatus for the decomposition of hazardous material utilizing a DC arc, comprising:

a gas-tight chamber including a sump which contains a molten bath;

inlet means for introducing the hazardous material into the chamber and the molten bath for initial decomposition of the hazardous material into a product within the molten bath and a gaseous product within the chamber, wherein the inlet means comprises a sealable passage having a closable entry port for access outside the chamber and a closable exit port providing communication inside the chamber, and puncturing means within the passage for puncturing containers with hazardous material therein;

electrode means for maintaining a DC arc within the chamber, the arc having a current level sufficient to promote the decomposition of the hazardous material;

exhaust means within the chamber proximate to the DC arc for the removal of gases from the chamber, whereby the gaseous product passes in the proximity of the arc for undergoing decomposition prior to removal thereof through the exhaust means.

19. The apparatus as recited in claim 18 including conduit means communicating between the sealable passage and the chamber for removing liquid hazardous material from the passage and introducing the liquid hazardous material into the chamber wherein said conduit means includes valve means for controlling and restricting the flow of liquid hazardous material from the passage into the chamber.

20. The apparatus as recited in claim 18 comprising screw conveyer means disposed within said passage for moving hazardous material through said passage into the chamber.

* * * * *